United States Patent
Pleiman et al.

(10) Patent No.: US 12,354,036 B2
(45) Date of Patent: Jul. 8, 2025

(54) EVENT TICKETING SYSTEM

(71) Applicant: DISH Network L.L.C., Englewood, CO (US)

(72) Inventors: Eric Pleiman, Centennial, CO (US); Jesus Flores Guerra, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/366,950

(22) Filed: Aug. 8, 2023

(65) Prior Publication Data
US 2025/0053886 A1 Feb. 13, 2025

(51) Int. Cl.
*G06Q 10/02* (2012.01)
(52) U.S. Cl.
CPC .................. *G06Q 10/02* (2013.01)
(58) Field of Classification Search
CPC .... G06Q 10/02; G06Q 30/06; G06Q 30/0631; G06Q 30/0207; G06Q 30/0641; G06Q 30/0241; G06Q 30/0277; G06Q 30/0206; G06Q 30/00
See application file for complete search history.

(56) References Cited

U.S. PATENT DOCUMENTS

| | | | | |
|---|---|---|---|---|
| 2004/0107439 A1* | 6/2004 | Hassell | .............. | H04N 21/4312 725/51 |
| 2013/0227011 A1* | 8/2013 | Sharma | .................. | G06Q 50/01 709/204 |
| 2015/0154571 A1* | 6/2015 | Zamer | .................... | G06Q 10/02 705/5 |
| 2019/0318412 A1* | 10/2019 | Constantinescu | ..... | H04L 67/306 |
| 2019/0340580 A1* | 11/2019 | Bentley | ................. | H04L 51/216 |
| 2021/0158423 A1* | 5/2021 | Ngo | .................... | G06Q 30/0641 |
| 2023/0101514 A1* | 3/2023 | Lloyd | .................... | G06Q 10/02 705/347 |

OTHER PUBLICATIONS

Al-Ghossein, Marie, Abdessalem Talel, and Anthony Barré. "Open Data in the Hotel Industry: Leveraging Forthcoming Events for Hotel Recommendation." Information Technology & Tourism 20.1-4 (2018): 191-216 ProQuest. Web. Feb. 27, 2025 (Year: 2018).*

* cited by examiner

*Primary Examiner* — Michael P Harrington
(74) *Attorney, Agent, or Firm* — Wash Park IP Ltd.; John T Kennedy

(57) ABSTRACT

Devices, systems and process for automated event ticketing are disclosed. A system includes: a user device having a data store and a processor coupled to the data store; a set top box ("STB"), coupled to the user device, having an STB data store and an STB processor; and at least one event server, coupled to the STB providing event data and event ticketing data for a plurality of events. Based on user preference data received from the user device, the STB processor searches the plurality of events for a given event which matches, at least in part, the user preference data, and when instructed by the STB, the event ticketing engine facilitates ticketing of the given user to the given event. When executed, first computer instructions instantiate a content application that performs content monitoring and user preferencing, and based on the foregoing generates user preference data.

12 Claims, 7 Drawing Sheets

EVENT TICKETING SYSTEM

TECHNICAL FIELD

The technology described herein generally relates to devices, systems, and processes for facilitating automatic ticketing of a user to one or more events.

BACKGROUND

User of electronic devices commonly consume content (by watching, listening, or otherwise) from one or more performers, teams, actors, directors, or the like on a repeat basis. For example, a user may be a fan of or otherwise like (or dislike) a given musical group, musician, sporting team, sports star, public speaker, or otherwise (herein, individually and collectively "artist(s)") commonly will consume content performed by such artist(s) on a repetitive basis. As user herein, "artists" also refers to types of events in which a given user may participate (e.g., a cycling ride or race, a marathon, a pickleball tournament, or the like).

Yet, such user may not be aware of when the artist will be actually (e.g., in a stadium, concert hall, or the like) and/or virtually (e.g., on a television program, music stream, or otherwise) presenting their content in a given user accessible "venue" (as further described below), for example, on a stage or via a content medium, such as a television program. Herein, an availability of such content, artist, or the like on a past, present or future basis is an "event"—as further defined below.

Further, a user (as further defined below) may not be aware of ticketing mechanisms by which tickets, or other participatory rights in and/or to a given event, at a given venue, and by a given artist may be obtained. Further, when aware of such ticketing mechanisms, the actual use of a given ticketing mechanism to obtain tickets to an event may be inconvenient to the user, inaccessible (e.g., barred by firewalls on company networks), or otherwise not readily available.

Accordingly, systems are needed for identifying to users when a given artist, collection thereof, or the like will be participating in an event and at a given venue, matching the user to the artist and venue and event, obtaining ticketing information for the event, and obtaining tickets to the event automatically (e.g., without user input), semi-automatically (e.g., based on user inputs of time, place, cost, or other "event characteristics—as defined below) and/or manually (e.g., with explicit user input and direction regarding one or more event characteristics).

SUMMARY

Various implementations are described of devices, systems, and processes for facilitating automatic ticketing of a user to one or more events.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation, an automatic event ticketing system may include: a user device, configured for use by a given user, that includes a user device data store and a user device processor coupled to the user device data store; a set top box (STB), coupled to the user device, that includes an STB data store and an STB processor; at least one event server, coupled to the STB providing event data and event ticketing data for a plurality of events; and where, based at least in part on user preference data received from the user device, the STB processor searches the plurality of events for a given event which matches, at least in part, the user preference data, and when instructed by the STB, the event ticketing engine facilitates ticketing of the given user to the given event. Other embodiments of this aspect include corresponding computer systems, apparatus, and computer programs recorded on one or more computer storage devices, each configured to perform the actions of the methods.

Implementations of a system for automatic event ticketing may include one or more of the following features. The user device data store may store first non-transient computer instructions which, when executed by the user device processor, instantiates a content application. The content application may perform content operations including: content monitoring operations, user preferencing operations, and generating user preference data for the given user, based on results from the content monitoring operations and user preferencing operations. The content monitoring operations may include identifying one of at least a content interest, an artist interest, a participatory interest, and another interest, for the given user; and generating a content viewing habit based on the content interest, artist interest, participatory interest, and other interest. The user preferencing operations may include: receiving the content viewing habit, receiving at least one user input of a content preference, receiving other data relating to given user, determining the user preference based on the content viewing habit, at least one content characteristic and at least user characteristic, and storing the user preference as user preference data in the user device data store.

For at least one implementation, the first non-transient computer instructions may, when executed by the user device processor, further instantiate an event application. The event application may configure the user device to perform event operations including event presentation operations and event monitoring operations. The event presentation operations may include presenting the given event to the given user for selection or rejection thereof by the given user. The event monitoring operations may include monitoring the given event, when selected by the given user, for updates thereto, and monitoring user event participation in the given event.

The event application may interoperate with an event search engine instantiated by the STB to identify and present the given event to the given user for selection or rejection thereof by the given user.

For at least one implementation, the STB data store may store second non-transient computer instructions which, when executed by the STB processor, instantiate an event search engine and an event ticketing engine. The event application may interoperate with an event ticket engine instantiated by the STB to obtain and facilitate use of an event ticket to the given event. The STB device data store may store second non-transient computer instructions which, when executed by the STB processor, instantiate an event search engine which conducts an Internet based search of the at least one event server for the given event from the plurality of events. The Internet based search may be based on at least one event characteristic that matches one or more of user preferences identified in the user preference data. The user preference data may be generated by the user device based on a content viewing habit determined, by the user device, for the given user.

For at least one implementation, the second non-transient computer instructions, when executed by the STB processor, further instantiate an event ticketing engine. The event search engine may output a final event search result to the event ticketing engine. The event ticketing engine performs ticketing operations including communicating the final event search result to the user device. The final event search result may identify the given event. The ticketing operations may also include receiving, from the user device, an acceptance or a rejection of the given event, receiving ticketing data from the user device when the given event is accepted by the given user; where the ticketing data facilitates procurement of a ticket for the given user to the given event, providing the ticketing data to the event server, receiving an event ticket from the event server, and providing access to the event ticket to the given user via the user device. Implementations of the described techniques may include hardware, a method or process, or computer software on a computer-accessible medium.

For at least one implementation of the present disclosure, a non-transitory computer readable medium, having stored thereon computer instructions which, when executed by a processor of a user device, may cause the user device to perform operations that may include instantiating a content application. The content application may perform content operations including content monitoring operations, user preferencing operations, generating user preference data for a given user of the user device, based on results from the content monitoring operations and user preferencing operations, and instantiating an event application. Other implementations may include corresponding computer systems, apparatus, and computer programs recorded on one or more computer storage devices, each configured to perform the actions of the methods.

Implementations may include one or more of the following features. The content monitoring operations may include identifying one of at least a content interest, an artist interest, a participatory interest, and another interest, for the given user, and generating a content viewing habit based on the content interest, artist interest, participatory interest, and other interest. The user preferencing operations may include receiving the content viewing habit, receiving at least one user input of a content preference, receiving other data relating to the given user, determining the user preference based on the content viewing habit, at least one content characteristic and at least user characteristic, and storing the user preference as user preference data in the user device data store.

For at least one implementation, the event application may configure the user device to perform event operations including event presentation operations and event monitoring operations. The event presentation operations may include presenting a given event to the given user for selection or rejection thereof by the given user. The event monitoring operations may include monitoring the given event, when selected by the given user, for updates thereto, and monitoring user event participation in the given event by the given user. For at least one implementation, the event application may interoperate with an event search engine instantiated by a set top box to identify and present the given event to the given user for selection or rejection thereof by the given user. Implementations of the described techniques may include hardware, a method or process, or computer software on a computer-accessible medium.

For at least one implementation of the present disclosure, a non-transitory computer readable medium, having stored thereon computer instructions which, when executed by a processor of a set top box (STB), may cause the STB to perform operations that may include instantiating an event search engine. The event search engine may conduct an Internet based search of at least one event server for a given event from a plurality of events. The given event may have at least one content characteristic that matches at least one user characteristic for a given user. The at least one user characteristic may be based on a content viewing habit for the given user determined by a user device. Ticketing of the given user to attend the given event may occur. Other implementations may include corresponding computer systems, apparatus, and computer programs recorded on one or more computer storage devices, each configured to perform the actions of the methods.

Implementations may include one or more of the following features. The operations further may include instantiating an event ticketing engine. The event search engine may output a final event search result to the event ticketing engine. The event ticketing engine may perform ticketing operations including communicating the final event search result to the user device (the final event search result identifying the given event), receiving, from the user device, an acceptance or a rejection of the given event, receiving ticketing data from the user device when the given event is accepted by the given user (the ticketing data facilitating procurement of a ticket for the given user to the given event), providing the ticketing data to the event server, receiving an event ticket from the event server, and providing access to the event ticket to the given user via the user device. Implementations of the described techniques may include hardware, a method or process, or computer software on a computer-accessible medium.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
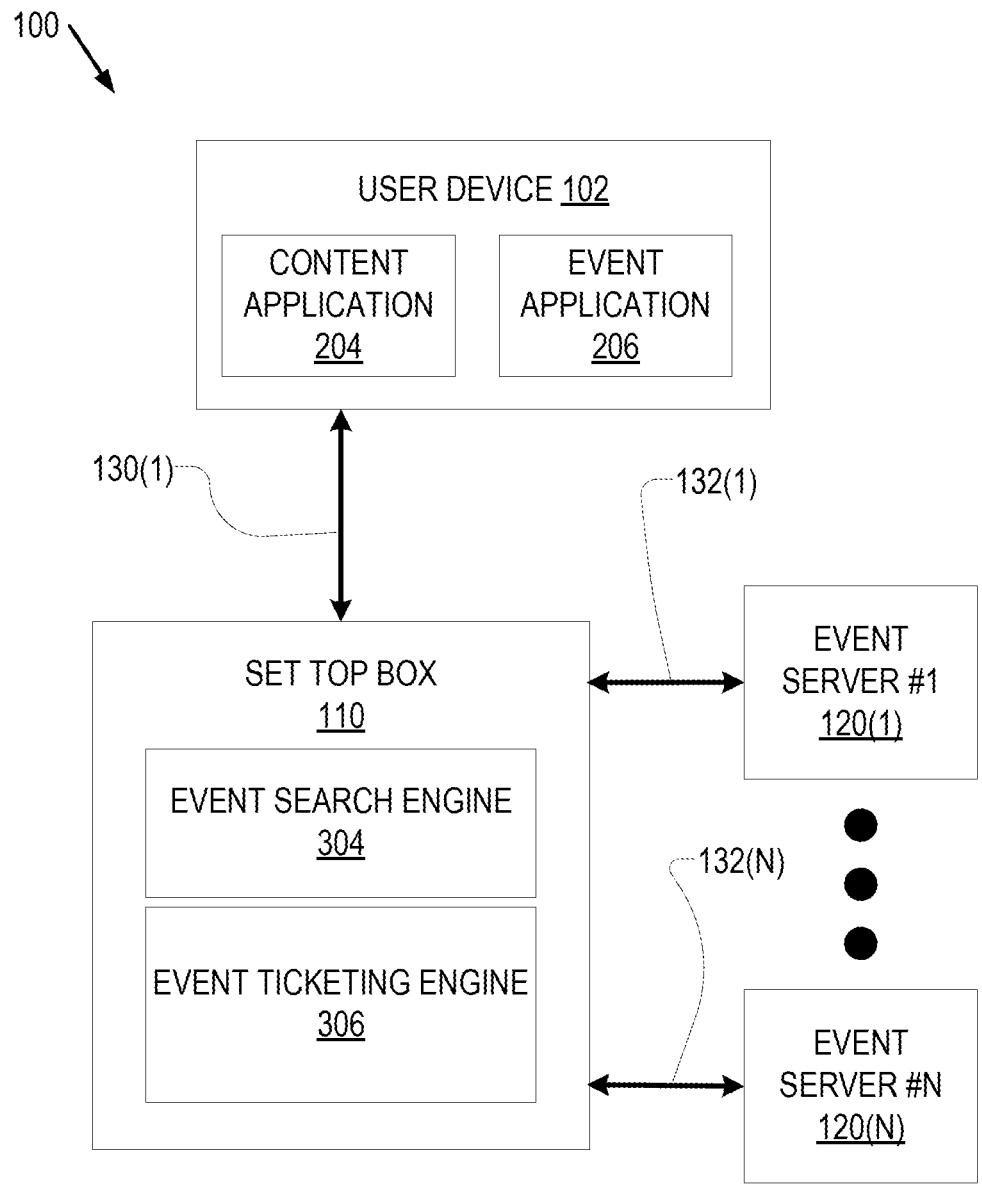
FIG. 1 is a schematic illustration of an event ticketing system for automatic and/or semi-automatic ticketing of a user to at least one event based on at least one of a user preference, a user content viewing history, and/or a user event history and in accordance with at least one implementation of the present disclosure.

Various implementations of the present disclosure describe devices, systems, and processes for automatic and/or semi-automatic scheduling of a user to at least one event based on at least one of a user preference, user content viewing history, and/or a user event history (herein, "Automatic Event Ticketing" (AET)).

"Acceptable delay" is a delay of less than a given metric, for example and not by limitation, four seconds (4 s) under normal system load conditions and thirty seconds (30 s) under heavy system load conditions. An acceptable delay may vary based on current system load conditions.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between components of a device. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating AET functions. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Component" herein refers to a Module of a Device, as further defined herein.

"Computer Data" herein refers to Data, as further defined herein.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Computer instruction" herein refers to an Instruction, as further defined herein.

"Communications Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in an ETS.

"Content" herein refers to data that that may be presented, using a suitable presentation device, to a user in a humanly perceptible format. When presented to a human, the data becomes "information." Non-limiting examples of content include gaming images and graphics such as those related to television programs, streaming video, music, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized. Content may identify artists, events, venues or the like.

"Content Characteristic" herein refers to data, which may include metadata, which identifies one or more attributes, features, qualities, properties, traits, aspects, elements, facets, styles, tone, members, performers, specialties, directors, or the like for a given content. For a non-limiting example, a content characteristic may identify a given content as being performed by a given entity, such as a college football game being performed by a given college or university. For another non-limiting example, a content characteristic may identify a given person as performing in a given content, such as an actor performing in a movie, a singer performing a song, or otherwise. A content characteristic may identify whether a user may participate in a given event.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet has a non-transient state. For example, and not by limitation, data may take any form including as one or more applications, content, or otherwise. Instructions, as further described herein, are a form of data.

"Data store" herein refers to any device, combinations of devices, component of a device, combinations of components of one or more devices, or the like configured to store data on a temporary, permanent, non-transient, or other basis. A data store is also referred to herein as a "computer readable medium." A data store may store data in any form, such as electrically, magnetically, physically, optically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient data, computer instructions, or other the like may be suitably stored in a data store. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient data with the data, while stored, being herein deemed to be non-transient data.

"Device" and "electronic device" herein refer to any known or later arising electrical device configured to, singularly and/or in combination, communicate, manipulate, output for presentation as information to a human, process, store, or otherwise utilize data. Non-limiting examples of devices include User Devices, Set Top Boxes, and Event Servers.

"Event" herein refers to an activity that a user may engage in that is identifiable by one or more event characteristics and with respect to which a user may attend or participate in (herein such attendance and/or participation by a given user being a "user engagement"). A user engagement may occur on a free, paid, payable, or other basis. A user engagement in or at an event may occur on a pre-planned, ticketed, scheduled, ad hoc, and/or other basis. An event may involve actions performed by others, that the user views or otherwise perceives (audibly, visually and/or otherwise) (e.g., an event being a professional sports content to which a given user attends). An event may include user participation in one or more portions of the event (e.g., an audience member participating in a magic act). An event may include full user participation therein (e.g., a GRAND FONDO in which the user rides their bicycle, a marathon in which the user runs, or otherwise).

"Event Characteristic" herein refers to data, which may include metadata, which identifies one or more attributes, features, qualities, properties, traits, aspects, elements, facets, styles, tone, members, performers, specialties, directors, or the like for a given event. For a non-limiting example, an event characteristic may identify a given event as being performed by a given entity, such as a college football game being performed by a given college or university. For another non-limiting example, an event characteristic may identify a given person as performing in the given event, such as an actor performing in a movie, a singer performing a song, or otherwise. An event characteristic may identify a "venue" for the event—with a venue existing physically and/or virtually for a given event.

"Event Server" herein refers to one or more computer servers, data stores, applications, and the like which, singularly and/or cooperatively, facilitate one or more AET functions. As used herein, an "event server function" (ESF) is one or more data processing operations and communications operations performed by one or more event servers which facilitate AET. An event server may also include one or more communications interfaces, user interfaces, security, power, busses, and related components. The event server components may be physically, logically, virtually or otherwise grouped and/or coupled to facilitate one or more AET functions including, but not limited to, those identified herein.

"Instruction" herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for a device that is configured to provide at least one feature and/or output signal and/or perform at least one function including one or more of the features, output signals and functions described herein. A module may provide the one or more functions using computer engines, processors, computer instructions and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the providing to and/or use by a device of electrical power. Non-limiting examples of such technologies include batteries, power converters, inductive charging components, line-power components, solar power components, and otherwise.

"Processor" herein refers to one or more known and/or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Security Component/Security" herein refers to any known or later arising components, processors, computer instructions, modules, and/or combinations thereof configured to secure data as communicated, processed, stored, output for presentation to a user, or otherwise manipulated. Non-limiting examples of security components include those which implement encryption/decryption standards, such as an Advanced Encryption Standard (AET), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Set Top Box" (STB) herein refers to one or more devices, servers, data stores, communications interfaces, and related components which, singularly and/or cooperatively, facilitate one or more AET functions. As used herein, an "STB function" (STBF) is one or more data processing and/or communications operations performed by one or more STBs, which facilitate one or more AET functions. An STB may include one or more processors, data stores, communications interfaces, user interfaces, busses, and related components. The STB components may be physically, logically, virtually or otherwise grouped and/or coupled to facilitate the one or more AET functions including, but not limited to, those identified herein.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay. For at least one implementation, substantial simultaneity occurs within an acceptable delay (as described above).

"User" herein refers to one or more of a single person, a household of people (such as those in a family), a collection of people (e.g., those in a fraternal organization or a club), or any other association of one or more human beings. A given household may have multiple users and/or collections of users (e.g., parents being one collection of users with children being a second collection of users in a household).

"User Device" herein refers to a device configured for use by a user to communicate, generate, compute, present, process, store, or otherwise manipulate data and/or information. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Automatic Event Ticketing System 100

As shown in FIG. 1 and for at least one implementation of the present disclosure, an AET System ("AETS") system 100, may include: a user device 102, executing a content application 204 and an event application 206; an STB 110, executing an event search engine 304 and an event ticketing engine 306; and one or more event servers 120(1) to 120(N) (where "N" is an integer and identifies a given event server 120). The user device 102 and STB 110 may be communicatively coupled by a first coupling 130 and the STB 110 and event servers 120 may be communicatively coupled by one or more second couplings 132(1) to 132(N).

User Device 102

Figure 2:
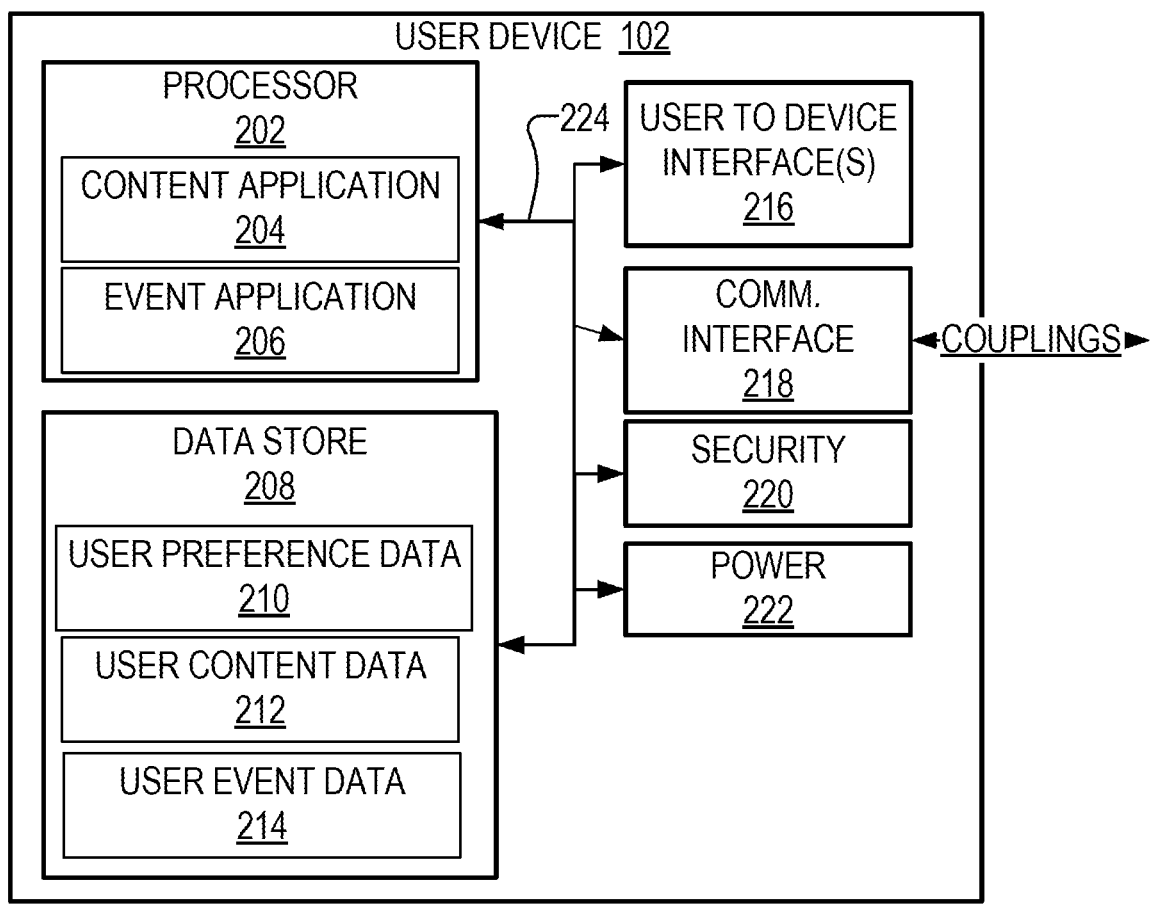
FIG. 2 is a schematic illustration of a user device configured for use in the event ticketing system of FIG. 1 and in accordance with at least one implementation of the present disclosure.

As further shown in FIG. 2 and for at least one implementation, the AETS 100 may include one or more user devices 102. A user device 102 may include one or more device components including, but not limited to, a user device processor 202, a user device data store 208, a user interface 216, a communications interface 218, a security component 220, a power component 222, a bus 224, and other components. The one or more components may be provided with the user device 102 or elsewhere; e.g., a remote data store accessible to the user device 102 by one or more couplings may be used in at least one implementation.

For at least one implementation, one or more features and/or functions provided by a user device 102 may be provided by multiple user devices configured to operate together in a mesh or similar network configuration. For example, a first user device 102 associated with a first user in a given household may receive event data and determine if/when and where the first user may be available to attend a given event, while a second user device 102 associated with a second user in the given household may also receive the event data and second determine if/when and where the second user may be available to attend the given event. The first user device 102 and the second user device 102 may communicate data indicative of such availability to a STB 110, associated with the given household, which (via an event search engine 304 instantiated thereby) determines which of multiple event occurrences (when more than one exist) are compatible with calendars for both the first user and the second user, or one of the first user and second user, and generate an event list for presentation to one or more of the first user and the second user.

For at least one implementation, the content application 204 and/or event application 206 may be configured to interface with other applications executing on a given user device, such as email, text messaging, chat, social media, and the like and provide information regarding an event list, event ticketing, or the like to a given user.

Content Application 204

The user device processor 202 may be configured to execute non-transient computer instructions which instantiate a content application 204. The computer instructions for the content application 204 may be stored in the data store, provided on the Cloud, or otherwise accessible by the user device 102. For at least one implementation, the content application 204 may be configured to perform "content operations" which may include: "content monitoring operations" and "user preferencing operations."

Content Monitoring Operations: For at least one implementation, content monitoring operations may include monitoring selections, viewing, saving, re-viewing, participation in (e.g., a user participating in a tennis match), and/or other actions, with respect to a given user, and with respect to a given content. The content monitoring operations result in a generation of user content data 212.

The content application 204 may populate user content data 212 based on a user's content viewing habits. For at least one implementation, machine learning and artificial intelligence ("ML/AI") processes may be used to determine a content viewing habit for a given user. As used herein, "content viewing habit" refers to an engagement in and/or with a given content (e.g., a KANSAS CITY CHIEFS™ football game) or a given classification of content (e.g., an NFL™ football game). The content may occur in any humanly perceptible form and may include audibly, visually, haptically and/or other forms of user perceptible content.

For at least one implementation, a content viewing habit may also include a user participation in a given content (e.g., a user participating in a tennis match). Herein, an engagement may be "numerous"—which refers to at least two or more instance of a user viewing and/or participating in and/or with respect to a given content, where the given content has at least one quantifiable content characteristic and within a given period. The ML/AI processes may specify the "given period" as being one period (e.g., over a period of a given college football season), numerous unique periods (e.g., over multiple college football seasons), portions of a period (e.g., a period encompassing football playoffs or the like), or otherwise. The ML/AI may use different given periods to determine a content viewing habit for a given user based on one or more content characteristics, one or more user characteristics, and the like. For example, the content application 204 may be configured to determine that a given user has watched, over a the last "N" seasons, numerous KSU™ football matches and based thereon identify a content viewing habit, for that user, of KSU football matches. The content application 204 may be configured to store user content viewing habits as user content data 212 in the user device data store 208.

User Preferencing Operations: For at least one implementation, user preferencing operations may include determining, based on at least one result obtained from the content monitoring operations, one or more user preferences with respect to the given content and/or with respect to other content. A user preference may be based, in whole or in part, on a content viewing habit, for the given user, determined by the content monitoring applications. The user preferencing operations may also include determining one or more user demographics. The user demographics may be based on user provided data and/or other data. The user preferences may be stored as user preference data 210 in the user device data store 208.

The user preference data 210 may be populated based on user inputs. For example, a user watching a given sporting event may indicate, using, e.g., a remote control device or the like, a preference for watching sporting events by a given artist, a team, an organization, or the like. For example, a user may enjoy watching KANSAS STATE UNIVERSITY (KSU) football matches and may instruct, via their user device 102, the STB 110 or another device to record one or more future arising broadcasts, streaming presentations, or the like of KSU football matches.

The content application 204 may be further configured to utilize ML/AI processes and numerous instances of other content viewing habits for a given user to further determine user preferences for content based upon user characteristics and/or other content characteristics. For example, a user who attended KSU may be specified by the ML/AI processes as preferring KSU events and based upon determined preferences for other types of football events (e.g., the user having previously watched numerous KANSAS CITY CHIEFS™ football games) a user preference for KSU football games may be generated and populated into the user preference data 210. For another example, a win/loss record for KSU football, and based thereon generate a user preference indicative of the given user preferring to watch KSU football when the team record exceeds a given threshold, is expected to exceed a given threshold, and/or in spite of a team record meeting, exceeding, or falling behind any given win/loss threshold (for example, a user preference indicative of the user desiring to watch KSU football when they are good, bad, or otherwise).

The content application 204 may store the user preference(s) as user preference data 210 in the user device data store 208.

Figure 4:
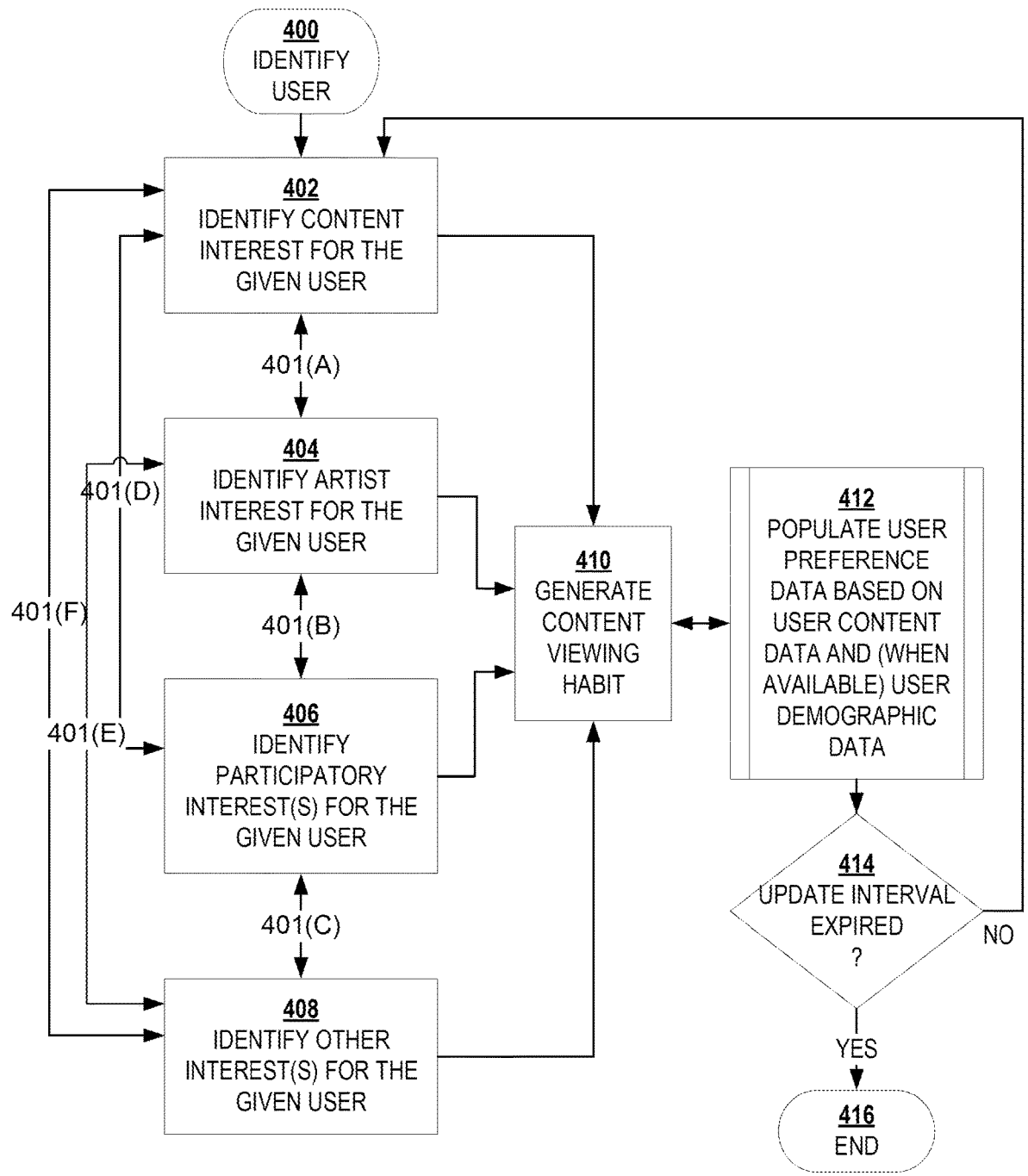
FIG. 4 is a flow chart illustrating a process for a content application executed by a processor in a user device and in accordance with at least one implementation of the present disclosure.

As shown in FIG. 4, one implementation of a content application may include the following operations. As per Operation 400, the content application may identify a user. Identification of the user may occur based upon user inputs (e.g., a sign-on and password being entered into the user device 102), based on user viewing characteristics (e.g., a given user commonly utilizing the user device 102 to consume content at a given time or during a given period), or otherwise.

As per Operation 402, the content application may identify a content interest for the user. For example, a user commonly watching college football games may be associated with having a content interest for college football.

As per Operation 404, the content application may identify, based on a content interest, an artist interest for the user. For example, a user who continually views college football games where one of the two teams participating therein is K-STATE, may be identified by the content application as having an artist interest in K-STATE football.

As per Operation 406, the content application may identify, based on a user's past and/or planned participation in an event (e.g., a user previously having participated in a marathon and/or scheduled to participate in a marathon), a participatory interest for the user in one or more types of event(s). Such interest may include an indication of whether such interest is competitive interest, a participatory interest, a spectator interest, a supporting interest (e.g., a user who has an interest in facilitating another's participation in an event), or the like.

As per Operation 408, the content application may identify "other" interests for the user. Such other interests may be identified based on any data available to the content application including, but not limited to, user interest inputs, user preferences, user behaviors (as determined from any user monitoring devices, services, processes or the like), or otherwise.

As shown in FIG. 4 by the overlapping connectors 401(A)-401(F), Operations 402-408 may occur in any order, sequence, iteration or otherwise. For at least one implementation, Operations 402-408 may occur iteratively. For example, a user content interest may be further identified and/or refined based on a user participatory interest, or vice versa. For a non-limiting example, a user who frequently watches NASCAR™ races on television (a content interest) and who enjoys racing go-carts (a participatory interest) (as determined, e.g., from driving records provided by BOONDOCKS™ or another amusement venue) may have an interest in attending, participating in, supporting, or otherwise engaging an and/or with advanced auto driving event (e.g., an ANDRETTI™ driving school event).

As per Operation 410, and as based on one or more outputs of Operations 402-408, the content application may generate content viewing habit which is stored as user content data 212 in the user device data store 208.

As per Operation 412, the user content data may be used to populate, at least in part, user preference data 210, and stored in the user device data store 208. The populating of the user preference data 210 may also include, when available, use of user demographic data.

As per Operation 414, the content application populates and/or updates the user preference data 210 on a recurring basis. For at least one implementation, such populating/updating occurs on a given update interval ("U"), based on sign-on(s) by and/or unique use instances of the user device 102 by the given user. For at least one implementation U=1 and one or more of the operations of FIG. 4 are implemented with every sign-on of a given user onto the user device 102. For another implementation, U=5 and the one or more operations of FIG. 4 are implemented after every $5^{th}$ sign-on, by a given user, onto a user device 102.

As per Operation 416, the process ends after the update interval U has expired.

Event Application 206

The user device processor 202, in the user device 102, may be configured to execute non-transient computer instructions which instantiate an event application 206. The computer instructions for the event application 206 may be stored in the user device data store 208, provided on the Cloud, or otherwise accessible by the user device 102.

For at least one implementation, the event application 206 may be configured to perform "event operations" including "event presentation operations" and "event monitoring operations"

Event Presentation Operations: For at least one implementation, an event presentation operation may include presenting one or more events to a user of a given user device 102 for selection or rejection thereof. The event application 206 may identify the one or more events to present to the user using ML/AI operations as applied to events available for presentation, user preference data 210, user content data 212, and user event data 214. The user event data 214 may be obtained from the user device data store 208 and may be populated based on past events a given user has selected for presentation, participation in, attendance or otherwise. For at least one implementation the user event data 214 may be populated based on one or more user demographics, collections of user demographics for similarly situated users (as identified by user preference data 210), or otherwise.

The event application 206 may interoperate with an event search engine 304, instantiated by the set top box ("STB") 110 (as described below) to identify one or more event characteristics which the event search engine 304 may use to search for future events for potential user selection.

Event Monitoring Operations: For at least one implementation, an event monitoring operation may include monitoring an event selected by a user for any updates thereto. For example, an event may be postponed, cancelled, delayed, rescheduled or otherwise modified due to weather, performer illness, or other conditions. The event application 206 may be configured to provide the user (of the given user device 102) with updates for the selected event.

For at least one implementation, event monitoring operations may also include monitoring of "user event participation" in a given event. As used herein, "user event participation" refers to user attendance, participation in (when relevant), performance, or the like with respect to a given event. For example, a user leaving an event early (before the event ends) may be monitored by the event application 206 and stored as user event data 214 in the user device data store 208. ML/AI processes may be applied, by the event application 206, to refine presentations of future events to the user for selection thereby. For example, user event data 214 indicative that a user that routinely leaves events before 10 p.m. may be utilized by the event application 206 and the content application 204 to refine one or more user preference data 210 to indicate that events ending prior to 10 p.m. are preferred by the user.

The event application 206 may interoperate with the event ticket engine 306, instantiated by the STB 110 (as described below) to facilitate the obtaining, storing, transfer, use, and/or other disposition of one or more event tickets for one or more events selected by the given user for attendance, participation, or otherwise therewith.

Figure 5:
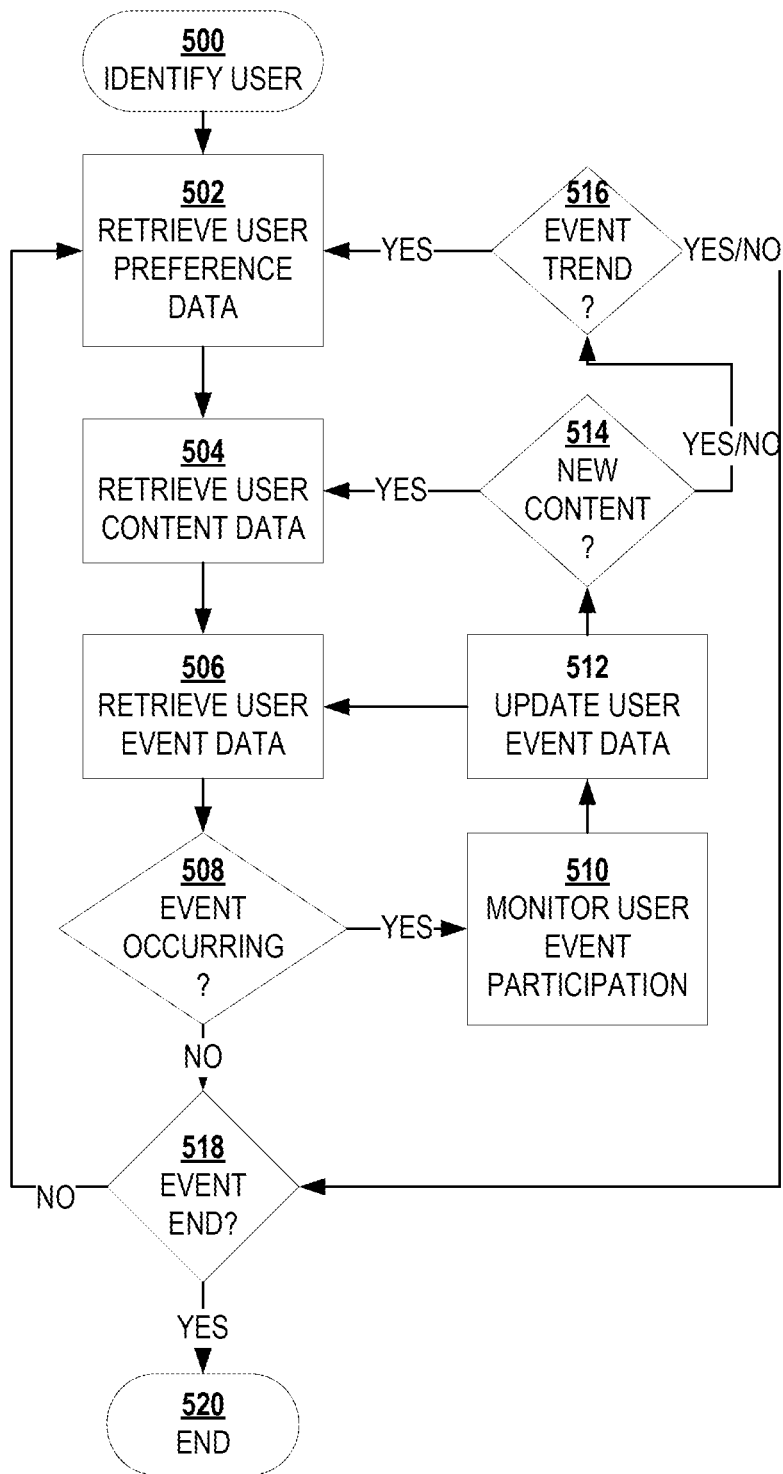
FIG. 5 is a flow chart illustrating a process for an event application executed by a processor in a user device and in accordance with at least one implementation of the present disclosure.

As shown in FIG. 5, one implementation of an event application 206 may include the following operations. As per Operation 500, the event application may identify a user. Identification of the user may occur based upon user inputs (e.g., a sign-on and password being entered into the user device 102), based on user viewing characteristics (e.g., a given user commonly utilizing the user device 102 to consume content at a given time or during a given period), or otherwise.

As per Operation 502, the event application 206 may retrieve user preference data 210 from the user device data store 208.

As per Operation 504, the event application 206 may retrieve user content data 212 from the user device data store 208. For at least one implementation, Operation 504 may occur, in whole or in part, substantially simultaneously with, in a parallel with, before, and/or after Operation 502.

As per Operation 506, the event application 206 may retrieve user event data 214 from the user device data store 208. For at least one implementation, Operation 506 may occur, in whole or in part, substantially simultaneously with, in parallel with, before and/or after Operation 502 and/or Operation 504.

For at least one implementation, Operations 502, 504 and 506 may occur using one or more threads of a multi-threaded processor. Operations 502, 504, and 506 facilitate one or more event presentation operations by identifying events that a given user may be interested in attending (or participating in), and presenting such event(s) to the user, based on results obtained from an event search engine 304, for user selection or rejection thereof.

As per Operation 508, the event application 206 may determine whether a given event is then occurring. If "Yes," the process may proceed to Operation 510. If "NO," the process may continue with Operations 502, 504 and 506.

As per Operation 510, the event application 206 may monitor user event participation before, during and after an event by performing one or more event monitoring operations.

As per Operation 512, the event application 206 may update user event data based upon one or more results obtained from the monitoring of user event participation per Operation 510. For example, a user who leaves a given event before it has ended may result in an update to user event data indicative thereof.

As per Operation 514, the event application 206 may monitor a user, during an event, to determine if new content is consumed by the user. For example, a user attending a concert with a headline band "B" may react positively to a warm-up band "W." If new content is consumed by the user (as represented by the "YES," branch, the event application may be configured to identify content by W as being new content and may provide data indicative thereof for storage as user content data 212. The process then proceeds with Operation 516.

As per Operation 516, the event application 206 may determine if an "event trend" is occurring. As used herein, an "event trend" is a statistically determined probability exceeding a given confidence threshold that a given user with perform or refrain from performing one or more actions with respect to a future event for a given artist, two or more artists, or otherwise. For a non-limiting example, an "event trend" may be formed when a given user leaves a given type of event at a given time. For example, a user who repeatedly leaves an MLB™ baseball game immediately after a "seventh inning stretch" may be associated with an event trend of leaving MLB games (and perhaps other forms of sporting events) before completion thereof. Further, when the user repeatedly stays for a full daytime MLB game but repeatedly leaves early for night-time MLB games, the event application may use ML/AI processes to associate the given user with an event trend of leaving events before a given time cut-off (e.g., before 10 p.m.). Such association may be used to populate one or more of user preference data 210, user content data 212, and/or user event data 214. The process then proceeds with Operation 518.

As per Operation 518, the event application 206 may determine whether a given event has ended. If "NO," the process may include using and/or updating one or more of user preference data 210, user content data 212 and/or user event data 214. The event application may be configured to repeatedly (including continually for at least one implementation) update and/or refine the user preference data 210, user content data 212 and/or user event data 214. If "YES," the process ends, as per Operation 520.

Set Top Box (STB) 110

Figure 3:
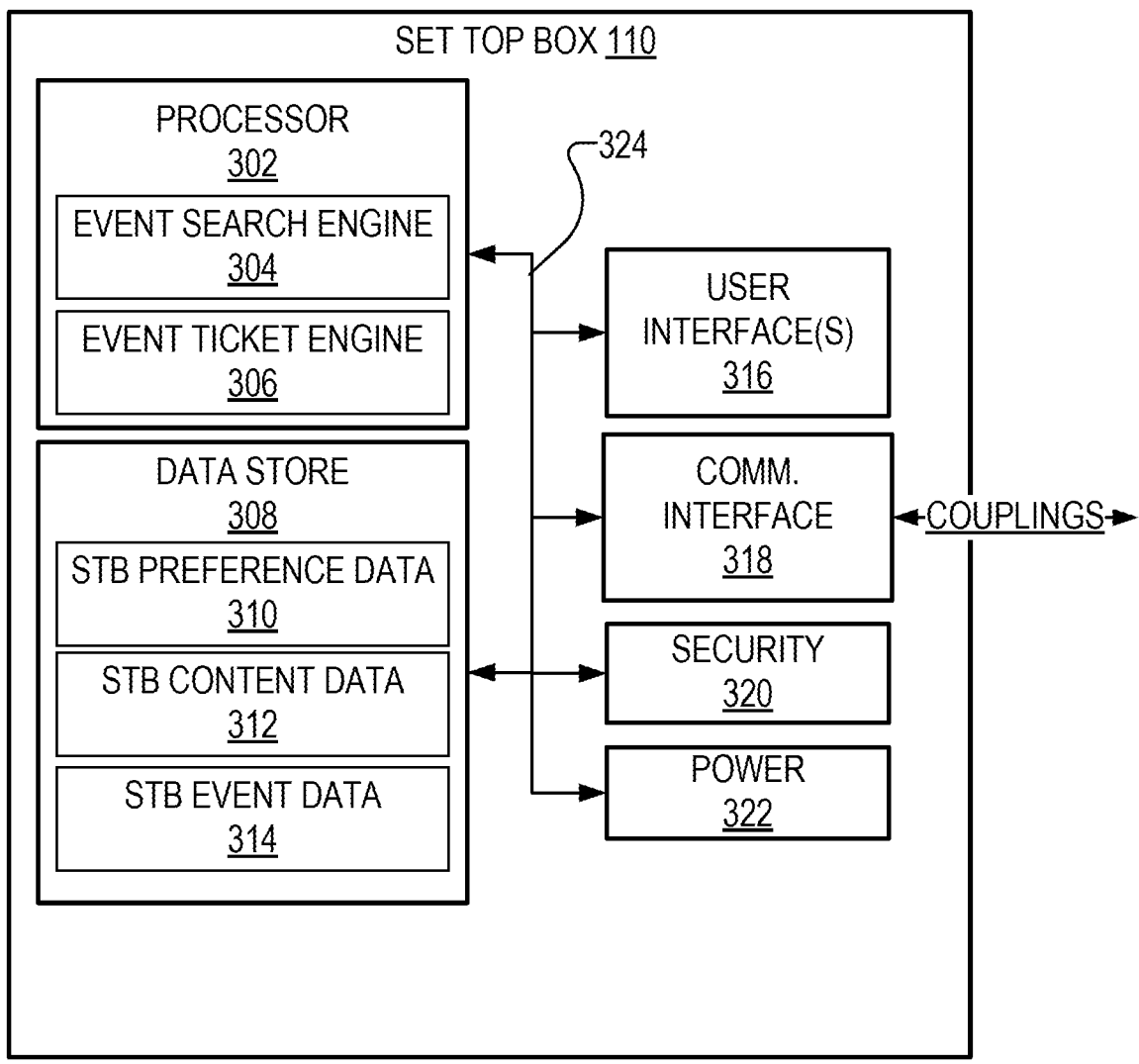
FIG. 3 is a schematic illustration of a set-top-box configured for use in the event ticketing system of FIG. 1 and in accordance with at least one implementation of the present disclosure.

As further shown in FIG. 3 and for at least one implementation, the AETS 100 may include one or more STBs 110. An STB 110 may include one or more device components including, but not limited to, a STB processor 302, a STB data store 308, a user interface 316, a communications interface 318, a security component 320, a power component 322, a bus 324, and other components. The one or more components may be provided with the STB 110 or elsewhere; e.g., a remote data store accessible to the STB 110 by one or more couplings may be used in at least one implementation.

Event Search Engine 304

The STB processor 302, in the STB 110, may be configured to execute non-transient computer instructions which, when executed, instantiate an event search engine 304. The computer instructions for the event search engine 304 may be stored in the STB data store 308, provided on the Cloud, or otherwise accessible by the STB 110.

The event search engine 304 may be configured to search the Internet for one or more events based on one or more user preferences, as provided by STB preferences data 310 stored in the STB data store 308 and/or obtained from user preference data 210 provided by the user device 102. The event search may be performed in view of one or more event characteristics and may include a search for event characteristics which match one or more user preferences, as stored in the STB preference data 310 and/or the user preference data 210.

For at least one implementation, the one or more event characteristics may be provided to the event search engine 304 by an event application 206 instantiated on a given user device 102.

For another implementation, the one or more event characteristics may be generated by the STB 110 using ML/AI processes and as further based on one or more of STB preference data 310, user preference data 210, STB content data 312, user content data 212. STB event data 314, and/or user event data 214.

The STB content data 312 may be generated by the STB 110 based on past selections of content, by a given user, for presentation thereto—as monitored by the STB 110. For at least one implementation, user content data 212 may be provided to the STB 110 by a content application 204 instantiated on a given user device 102 that is associated with a given user and used to populate the STB content data 312. For at least one implementation the user content data 212, as stored on the user device 102, and the STB content data 312, as stored on the STB 110, may include substantially the same data.

The STB event data 314 may be generated by the STB 110 based on one or more selections and/or rejections of prior events, current events, and/or future events—as monitored by the STB 110. For at least one implementation, user event data 214 may be provided to the STB 110 by an event application 206 instantiated on a given user device 102 that is associated with a given user and used to populate the STB event data 314. For at least one implementation the user event data 214, as stored on the user device 102, and the STB event data 314, as stored on the STB 110, may include substantially the same data.

The event search engine 304 may be configured to periodically query one or more event servers 120(1)-120(N) for events and event characteristics thereof. The STB 110 may be configured to store data provided by the one or more event servers 120(1)-120(N) as STB event data 314. For at least one implementation, the STB event data 314 may be provided on a periodic, when requested, scheduled, ad hoc, or any other basis to the event application 206 for a given user device 102.

The event search engine 304 may utilize ML/AI to identify future events that may be of interest to a given user based on correlations of one or more event characteristics with one or more user preferences. For at least one implementation, the event search engine 304 may utilize an iterative process to more specifically identify a given event for a given user. For example, an event server (e.g., a TICKETMASTER™ server or a LIVE NATION™ server) may identify a musical group (e.g., U2™) as having upcoming performances in multiple cities and/or on multiple dates and times. The event search engine 304 may determine that a given user may have an interest in viewing a U2 performance. Working in conjunction with the event application 206 executing on a user device 102 associated with the given user, the event search engine 304 may preselect a subset of the U2 performances and present such subset as an "event list" to the given user device 102. The given user device 102, via the event application 206 instantiated thereon, may determine which event(s) from the event list fits the given user's schedules, as provided by a calendaring application provided on and/or accessible via the user device 102 (non-limiting examples of such calendaring applications include MICROSOFT OUTLOOK™, GOGGLE CALENDAR™, and the likes).

Further selection and processing of an event, on an event list, into a "ticketed event" may then occur using functions facilitated by an event ticketing engine 306 instantiated by the STB.

For at least one implementation, the event search engine 304 may be configured to generate event searches based on content currently being presented to a user, via a given user device 102, and/or via the STB 110.

Figure 6:
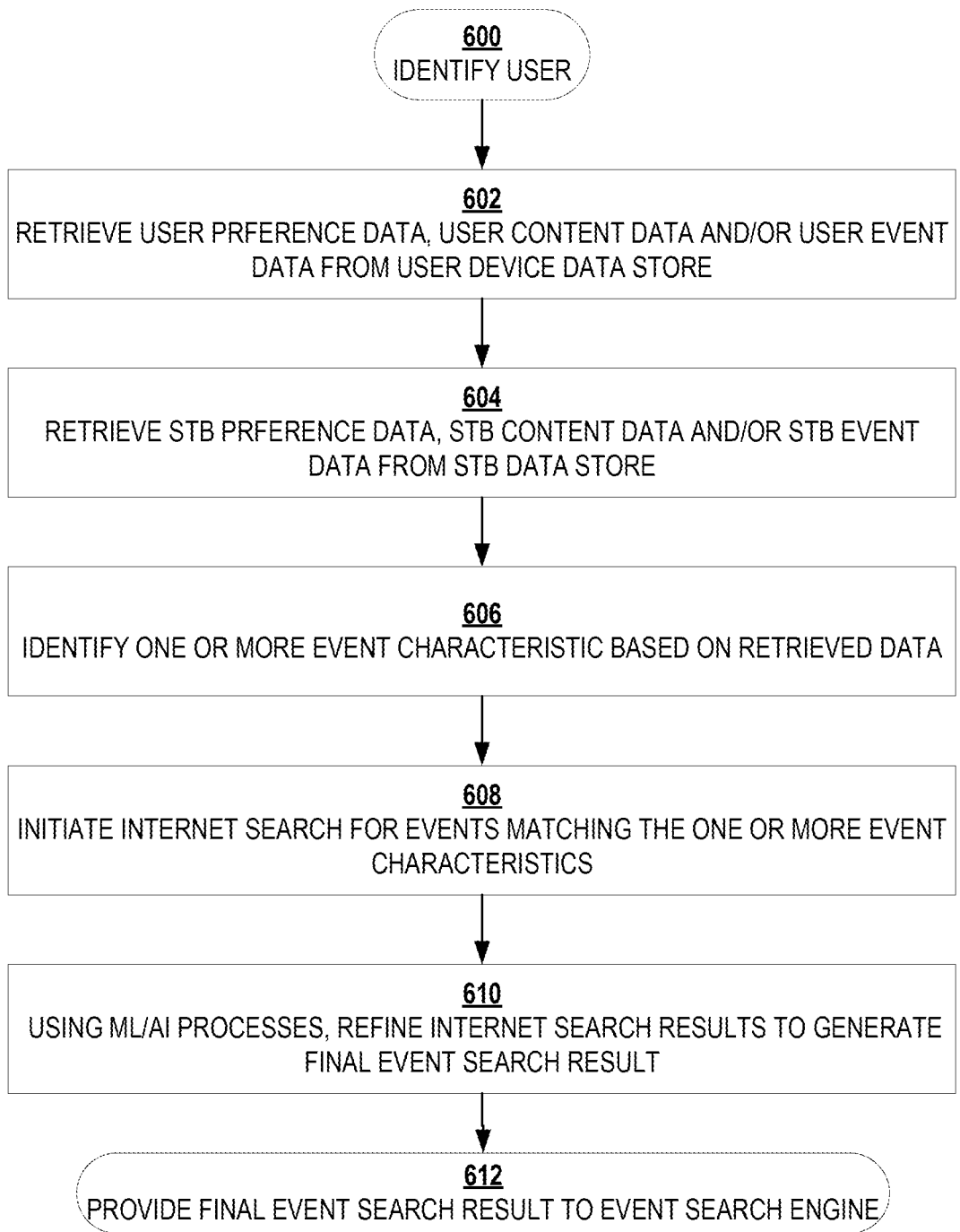
FIG. 6 is a flow chart illustrating a process for an event search engine executed by a processor in a set top box and in accordance with at least one implementation of the present disclosure.

As shown in FIG. 6, one implementation of an event search engine 304 may include the following operations. As per Operation 600, the event search engine 304 may identify a user. Identification of the user may occur based upon user inputs (e.g., a sign-on and password being entered into the user device 102), based on user viewing characteristics (e.g., a given user commonly utilizing the user device 102 to consume content at a given time or during a given period), or otherwise.

As per Operation 602, the event search engine 304 may retrieve user preference data 210, user content data 212, and/or user event data 214 from the user device data store 208.

As per Operation 604, the event search engine 304 may retrieve STB preference data 310, STB content data 312, and/or STB event data 314 from the STB data store 308

For at least one implementation, Operation 604 may occur, in whole or in part, substantially simultaneously with, in parallel with, before and/or after Operation 602. For at least one implementation, Operations 602 and 604 may occur using one or more threads of a multi-threaded processor.

As per Operation 606, using the data retrieved per Operations 602 and 604, the event search engine 304 identifies one or more event characteristics.

As per Operation 608, the event search engine 304 initiates an Internet search for events matching the one or more event characteristics and obtains first set of search results As per Operation 610, using ML/AI processes, the event search engine 304 refines the Internet search by using more or less event characteristics to identify a "final event search result." The final event search result identifies those one or more (if any) events which correspond to one or more of the user preference data 210, user content data 212, user event data 214, STB preferences data 310, STB content data 312, and STB event data 314.

As per Operation 612, the process ends with the final event search result being provided to the event ticketing engine 306.

Event Ticketing Engine 306

The STB processor 302, in the STB 110, may be configured to execute non-transient computer instructions which, when executed, instantiate an event ticketing engine 306. The computer instructions for the event ticketing engine 306 may be stored in the STB data store 308, provided on the Cloud, or otherwise accessible by the STB 110.

The event ticketing engine 306 performs "ticketing operations" which configure the STB 110 to facilitate "event ticketing" of a given user for a given event. The given event may be identified on an event list in a final event search result generated by the event search engine 304 and with respect to given user of a given user device 102. Event ticketing may include the event ticketing engine 306 receiving an indication from the user device 102 of a given event that a given user desires to attend or otherwise participate in. Second, the event ticketing engine 306 may provide (and/or collect from the user device 102) "ticketing data" that is requested and/or otherwise utilized by an event server 120 to procure a ticket to the given event and otherwise complete event ticketing for the given user to the given event. Third the event server 120 may generate, communicate, or otherwise make available, an "event ticket" and send the event ticket to the STB 110 which forwards such event ticket to the user device 102 or otherwise makes the event ticket available for use, by the given user, to the given event (whenever the given event occurs).

Non-limiting examples of ticketing data include: payment information (e.g., debit, credit or other financial and/or accounting data (when/as needed)); user data (e.g., user contact, billing and other data, emergency medical contact data, or the like); user preference data (e.g., seating preferences, acceptable price and/or price ranges, number of tickets needed, and the like); completed forms (e.g., liability waivers, parental permission slips, or the like); and the providing of other credential(s) (e.g., credentials identifying a given user as a VIP, a coach, a licensed photographer, or the like, credentials establishing a given user is capable of performing in a given event (e.g., past Marathon completion time and course information), or otherwise).

For at least one implementation, the event ticketing engine 306 may be configured to facilitate ticketing directly with one or more event servers 120. For another implementation, the event ticketing engine 306 may be configured to function as an intermediary which facilitates event ticketing between a given user device 102 and a given event server 120. For another implementation, the event ticketing engine 306 may be configured as a passive device which facilitates identification of an event server 120 for a given event, with the ticketing occurring directly (i.e., without use of the STB 110) between the user device 102 and the given event server 120.

For at least one implementation, one or more features and functions provided by the STB 110 may be facilitated, in whole or in part, on the Cloud. For a non-limiting example, the event search engine 304 may be instantiated by one or more event servers 120, which collectively identify events of interest to a given user and generate event data that is communicated to a given user device 102 for presentation to a given user by an event application 206 executing on such given user device 102.

For at least one implementation, a user device 102 and/or STB 110 may be configured to configure presentation, storing, retention, deletion or take any other action regarding one or more, including multiple instances of events, based on one or more user preference data 210, user content data 212, and/or user event data 214. For example, the user device 102 and/or STB 110 may be configured to automatically perform one or more actions, such as recording multiple instances of a team (e.g., recording all of the Chicago CUBS™ games), scheduling a vacation to coincide with one or more instances of an event (e.g., a vacation corresponding to one or more stages of the TOUR DE FRANCE™), scheduling a presentation with two or more users of a series of events (e.g., recording and showing STAR WARS™ movies prior to a scheduled viewing of a newest theatrical release of a STAR WARS episode), or otherwise.

Figure 7:
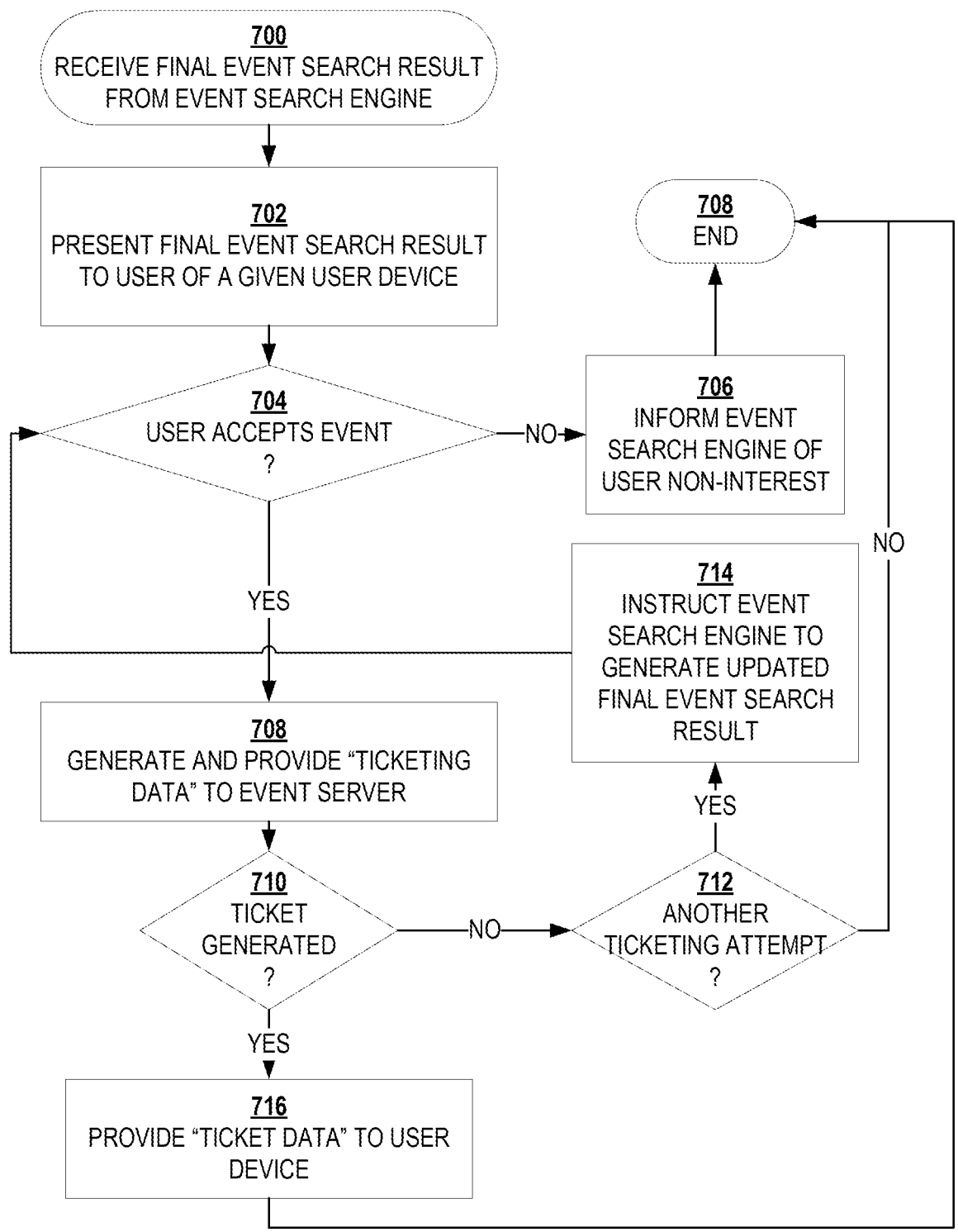
FIG. 7 is a flow chart illustrating a process for an event ticketing engine executed by a processor in a set top box and in accordance with at least one implementation of the present disclosure.

As shown in FIG. 7, one implementation of an event ticketing engine 306 may include the following operations. As per Operation 700, the event ticketing engine 306 receives the final event search result from the event search engine 304.

As per Operation 702, the event ticketing engine 306 communicates the final event search result to the user device 102 for presentation to a user thereof and selection or rejection thereof.

As per Operation 704, the event ticketing engine 306 receives, from the user device, an acceptance of an event identified in the final event search result or a rejection of all of the events (when more than one event is identified in the final event search result). If a rejection is received, the process proceeds to Operation 706. If an acceptance of an event is received, the process proceeds to Operation 708.

As per Operation 706, the event ticketing engine 306 informs the event search engine 304 that the user rejected all of the one or more events identified in the final event search result. The event search engine 304 may utilize the rejection information to further refine its event search and event search result generation processes and update one or more of STB preference data 310, STB content data 312 and STB event data 314. The rejection information may also be communicated to and used by the event application 206, for the user device 102 corresponding to the given user, to update one or more of the user preference data 210, user content data 212 and user event data 214. It is to be appreciated that the event ticketing engine 306 may facilitate user feedback with presentation of the final event search results to the user, or at a later time. Such user feedback may be used to further refine future event searches by the event search engine 304.

As per Operation 708, the event ticketing engine 306 may generate and provide "event ticketing data" (as described above) to the event server(s) 120 associated with a given event.

As per Operation 710, the event ticket engine 306 may receive data from event server(s) 120 indicating whether the event ticketing data has been accepted ("YES") or rejected ("NO"). When rejected, the process proceeds to Operation 712. When accepted, the process proceeds to Operation 714.

As per Operation 712, when the event ticket engine 306 receives a rejection of the "ticketing data" the process may include presenting the rejection to the user of the user device 102 (e.g., via an event application 206 executing thereon) and querying the user as to whether another ticketing attempt is to be made. If "YES," the process may proceed with Operation 716.

As per Operation 714, the event ticket engine 306 instructs the event search engine 304 to generate an updated final event search result. The updated final search result is received from the event search engine 304 and presented to the user, via the user device 102. The process then proceeds with Operation 704. It is to be appreciated that Operations 704-714 may occur repeatedly until tickets to an event are obtained from, or all tickets have been granted to other users by, an event server 120 for the given event.

As per Operation 716, the event ticket engine 306 receives from the event server(s) 120 event ticketing data that results in an event "ticket" being generated—the event ticket providing the user with the permissions, credentials, or the like needed for the user to attend the event. For at least one implementation, the "ticket" is a digital ticket. For another implementation, the "ticket" may be a virtual ticket that can be printed on paper as a physical ticket. For at least one implementation, the event ticket engine 306 may provide the "ticket" to the user device 102 via an event application 206 executing thereon. For another implementation, the event ticket engine 306 may notify the user device 102 that the "ticket" has been generated and is available for use via a third-party application, for example, a TICKETMASTER™ application or the like.

It is to be appreciated that the Operations depicted in FIGS. 4-7 may occur in sequence as shown, and/or in any other sequence of operations including one more operations occurring in parallel.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A system, facilitating automated event ticketing, comprising:
   a user device, configured for use by a given user, comprising:
      a user device data store non-transitorily storing first user device computer instructions which, when executed, instantiate an event application; and a user device processor coupled to the user device data store, configured to execute the first user device computer instructions and thereby instantiate the event application which configures the user device to perform event monitoring operation comprising:
monitoring user participation at each of a plurality of given events;
generating user event data based on the user participation at each of the plurality of given events;
storing the user event data in the user device data store;
determining, based on a machine learning analysis of the user event data for each of the plurality of given events, at least one user preference and a user event trend; and
storing the at least one user preference as user preference data and the user event trend as user event trend data;
wherein the at least one user preference indicates both a user preference for events having the one or more common characteristics and how the user will probably participate in future events having the one or more common characteristics;
a set top box ("STB"), coupled to the user device, comprising:
an STB data store non-transitorily storing first STB computer instructions which, when executed, instantiate an event search engine, and second STB computer instructions which, when executed, instantiate an event ticketing engine; and
an STB processor, coupled to the STB data store, configured to
execute the first STB computer instructions and thereby instantiate the event search engine, and execute the second STB computer instructions and thereby instantiate the event ticketing engine;
at least one event server, coupled to the STB providing at least one event database and event ticketing data for a plurality of events; and
wherein the event search engine performs event searching operations comprising:
receiving the user preference data and the user event trend data from the user device;
searching, based at least in part on the user preference data and the user event trend data, the at least one event database for at least one upcoming event that corresponds to the user preference data and the user event trend data; and
identifying to the user, via the user device, based on a correspondence of the user preference data and the user event trend data to the at least one upcoming event, one or more upcoming events in which the given user may be interested in participating; and
wherein the event ticketing engine performs event ticketing operations comprising:
receiving a selection from the user, via the user device, of a given event selected from the one or more upcoming events; and
facilitating ticketing of the given user to the given event.

2. The system of claim 1,
wherein the user device data store non-transitorily stores second user device computer instructions which, when executed by the user device processor, instantiates a content application.

3. The system of claim 2,
wherein the content application performs content operations including:
content monitoring operations;
user preferencing operations; and
further generating the user preference data for the given user, based on results from the content monitoring operations and user preferencing operations.

4. The system of claim 3,
wherein the content monitoring operations include:
identifying one of at least a content interest, an artist interest, a participatory interest, and another interest, for the given user; and
generating a content viewing habit based on the content interest, artist interest, participatory interest, and other interest.

5. The system of claim 4,
wherein the user preferencing operations include:
receiving the content viewing habit;
receiving at least one user input of a content preference;
receiving other data relating to the given user;
determining the user preference based on the content viewing habit, at least one content characteristic and at least user characteristic; and
further storing the user preference as the user preference data in the user device data store.

6. The system of claim 3,
wherein the event application configures the user device to perform event operations including event presentation operations and the event monitoring operations.

7. The system of claim 6,
wherein the event monitoring operations further include:
monitoring the given event for updates thereto; and
monitoring user event participation in the given event.

8. The system of claim 7,
wherein the event application interoperates with an event search engine instantiated by the STB to identify and present the given event to the given user for selection or rejection thereof by the given user.

9. The system of claim 1,
wherein the event application interoperates with an event ticketing engine to obtain and facilitate utilization by the given user of an event ticket to the given event.

10. The system of claim 9,
wherein the event search engine conducts an Internet based search of the at least one event server for the given event from the plurality of events.

11. The system of claim 10,
wherein the Internet based search is based on at least one event characteristic that matches one or more of user preferences identified in the user preference data; and
wherein the user preference data is generated, by the user device, based on a content viewing habit determined, by the user device, for the given user.

12. The system of claim 10,
wherein the event searching operations further comprise:
outputting a final event search result to the event ticketing engine; and
wherein the event ticketing operations further comprise:
communicating the final event search result to the user device;
wherein the final event search result identifies the given event;
receiving, from the user device, an acceptance or a rejection of the given event;
receiving ticketing data from the user device when the given event is accepted by the given user;
wherein the ticketing data facilitates procurement of a ticket for the given user to the given event;

providing the ticketing data to the event server;
receiving an event ticket from the event server; and
providing access to the event ticket to the given user via the user device.

* * * * *